(No Model.)

B. EDGAR.
NUT LOCK.

No. 602,394. Patented Apr. 12, 1898.

Witnesses
J. G. Hinkel
William E. Neff

Inventor
Butler Edgar
By Watson & Watson
Attorneys

UNITED STATES PATENT OFFICE.

BUTLER EDGAR, OF SUNBURY, PENNSYLVANIA, ASSIGNOR TO THOMAS M. RIGHTER, TRUSTEE, OF MOUNT CARMEL, PENNSYLVANIA.

NUT-LOCK.

SPECIFICATION forming part of Letters Patent No. 602,394, dated April 12, 1898.

Application filed June 11, 1897. Renewed March 8, 1898. Serial No. 673,147. (No model.)

*To all whom it may concern:*

Be it known that I, BUTLER EDGAR, a citizen of the United States, residing at Sunbury, in the county of Northumberland and State of Pennsylvania, have invented certain new and useful Improvements in Nut-Locks, of which the following is a specification.

This invention relates to improvements in devices for locking nuts to prevent them from becoming loose after they are screwed up against a part to be clamped, such as a railroad-splice.

In another application, filed by me June 9, 1897, I have described a nut-locking device which consists in providing the inner face of the nut or the opposing face of that part to be clamped against which the nut seats with one or more tapering grooves which open at the side or periphery of the nut, either at the larger end or at both ends, the nut being used in combination with small metal balls, which are dropped into one or more of the grooves after the nut has been screwed up tightly against the part to be clamped. The present invention consists in providing such a nut-locking device with a keeper adapted to continually press the ball toward the small end of the groove, thereby preventing the ball from becoming accidentally lost and improving its action as a nut-locking device. The keeper is arranged so that it can be applied after the nut is screwed up tightly and the ball inserted in the groove, one end or extension of the keeper being adapted to be passed into the larger end of the groove and seated against the ball.

The invention will be described in detail in connection with the accompanying drawings, in which—

Figure 1:
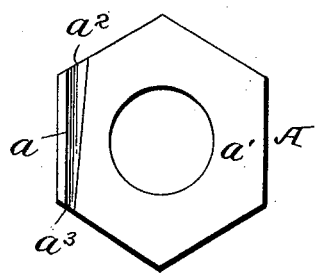
Figure 2:
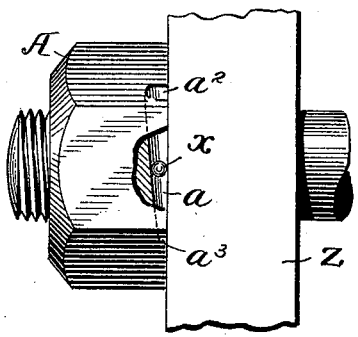
Figure 4:
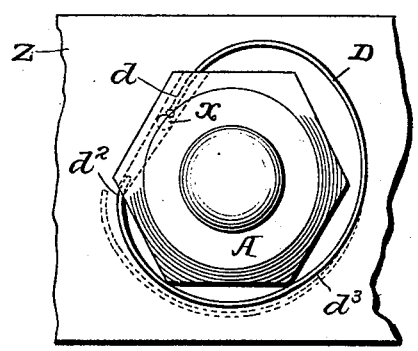
Figure 3:
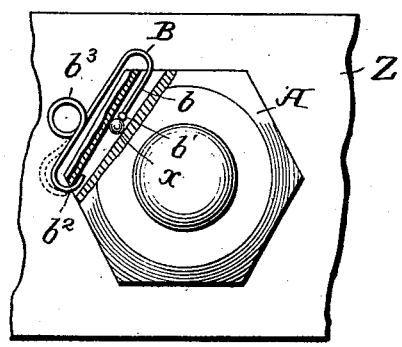
Figure 5:
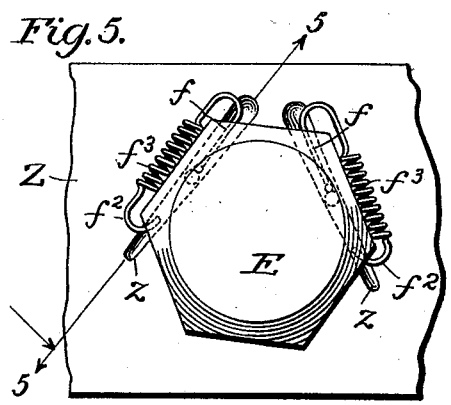
Figure 6:
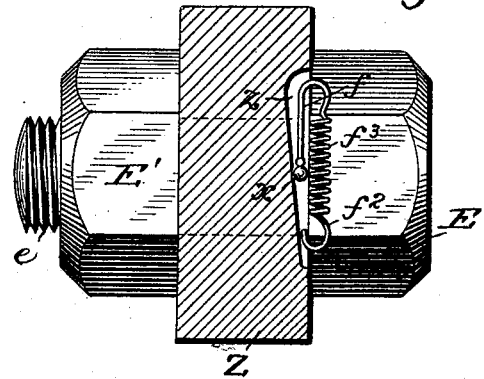

Figure 1 is a view of the inner face of a nut provided with a tapering groove. Fig. 2 shows the same nut combined with a bolt and splice-bar or other part to be clamped, the nut being broken away to show the ball. Fig. 3 is a side view of the parts shown in Fig. 2 with a spring-keeper applied to the ball, the nut being broken away to show the keeper. Fig. 4 is a view similar to Fig. 3, but showing a different form of keeper. Fig. 5 shows the invention applied to a bolt-head in such a manner as to prevent the bolt from turning in either direction. Fig. 6 is a section on the line 6 6 of Fig. 5, the bolt-head being shown in full.

In Fig. 1 the nut A is provided with a tapering groove $a$ upon its inner face $a'$, said groove having its larger end $a^2$ opening on one face of the nut and its smaller end $a^3$ opening on another face of the nut. The groove $a$ is preferably semicircular in cross-section, but it may be triangular or of any other desired sectional outline. Fig. 2 shows the nut screwed up tightly against a splice or other part Z.

In applying the nut-lock the nut is screwed up tightly and the ball $x$ afterward dropped into the larger end of the groove, the ball being of such a size that it will pass about halfway through and then lodge between the bottom of the groove and the part Z.

The present invention relates more particularly to a device or keeper for holding the ball in its proper position in the groove and urging it toward the smaller nut of the groove to increase its locking action.

In Fig. 3 I have shown a keeper B, consisting of a leg $b$, which extends into the groove and is preferably provided with a foot $b'$, adapted to rest on the ball. This foot may be formed in any suitable manner, such as by upsetting the end of the wire of which the keeper is formed or suitably bending the wire near its end. The keeper is retained on the nut by a hook $b^2$, which enters the smaller end of the groove $a$, and between the hook and the leg there is a coiled spring $b^3$, which constantly draws the leg B into the groove. The hook is short and does not interfere with the ball. In placing the keeper on or removing it from the nut the hook is bent outward into the position shown in dotted lines.

In Fig. 4 I have shown a keeper D, which has a leg $d$, a hook $d^2$, and a spring portion $d^3$, the spring consisting of a simple curve extending around the nut.

In Fig. 5 I have shown a modified form of the invention applied to a bolt-head E. In this figure there are two grooves $z$, formed in the plate Z, said grooves being inclined and tapering in opposing directions to prevent the bolt from turning in either direction. The grooves are sufficiently long to project at both ends beyond the periphery of the bolt-head to enable the balls to be dropped in after the bolt-head is tight against the part Z and also to permit the keepers to be readily applied. The operation of each of the grooves $z$ is the same as the operation of the grooves in the nuts above described when the ball is applied. The bolt-stem $e$ is shown provided with an ordinary nut E'.

In Figs. 5 and 6 I have shown another form of keeper F, having a leg $f$, a hook $f^2$, and an intermediate spring $f^3$.

In the various forms of my invention the tapering grooves are located in the clamping-face of the nut or in the opposing face of the part to be clamped, and the keeper is constructed with a leg which enters the larger end of the groove, a spring for constantly urging said leg into the groove against the ball, and a hook for retaining the keeper in place upon the nut. For convenience the hook is engaged with the smaller end of the groove; but it will be evident that a special hole or projection might be provided with which to engage the hook. The preferred direction of the groove or grooves is tangential to a circle drawn from the center of the nut or bolt, and I shall designate the grooves as "tangential" in the claims, it being understood, however, that such term includes curved or other grooves which are disposed in the general direction of tangents.

Under the term "nut" as used in the claims it is intended to include a screw or bolt head, such as that shown in Figs. 5 and 6, as well as the ordinary forms of nuts, it being evident that the locking devices operate in the same manner on nuts and bolt-heads.

The invention is applicable to nuts of various shapes and can be applied to ordinary bolts or screws or to nuts used in conjunction with threaded rods on bridges and other structures.

Having described my invention, what I claim, and desire to secure by Letters Patent, is—

1. The combination with a threaded bolt or rod, a nut, and a part to be clamped, one of the opposing faces of the nut and clamping part having a tapering tangential groove opening at its larger end at the side of the nut, of a ball adapted to fit in said groove and to bear against the opposing face when the nut is screwed up to said part, and a keeper having a leg entering the larger end of the groove and bearing upon the ball, a spring tending to draw the leg into the groove, and means for connecting the keeper to the nut or part to be clamped, substantially as described.

2. The combination with a threaded bolt or rod, a nut, and a part to be clamped, one of the opposing faces of the nut and clamped part having a tapering tangential groove opening at both ends at the sides of the nut, of a ball adapted to fit in the groove and to bear against the opposing face when the nut is screwed up to said part, and a keeper having a leg entering the larger end of the groove, a hook engaging the smaller end of the groove and an intermediate spring, substantially as described.

3. The combination of a threaded bolt or rod, a nut, and a part to be clamped, one of the opposing faces of the nut and clamped part having two tangential grooves inclined and tapered in opposing directions, said grooves opening at their larger ends at the sides of the nut, of balls adapted to fit in said grooves and to bear against the opposing face when the nut is screwed up to said part, whereby said nut is prevented from turning in either direction, substantially as described.

In testimony whereof I affix my signature in presence of two witnesses.

BUTLER EDGAR.

Witnesses:
J. A. WATSON,
W. CLARENCE DUVALL.